United States Patent

Cherry

[15] 3,689,826
[45] Sept. 5, 1972

[54] MOTOR VEHICLE POWER SUPPLY SYSTEM

[72] Inventor: James R. Cherry, Barrington, Ill.
[73] Assignee: Motorola, Inc., Franklin Park, Ill.
[22] Filed: May 24, 1971
[21] Appl. No.: 146,394

[52] U.S. Cl.....................322/29, 310/68 D, 320/61
[51] Int. Cl..................................................H02h 7/06
[58] Field of Search.............310/67, 68, 68 D, 198; 318/254; 322/29, 90, 22; 320/61

[56] References Cited

UNITED STATES PATENTS

| | | | |
|---|---|---|---|
| 3,229,179 | 1/1966 | Hetzel | 318/254 |
| 3,378,755 | 4/1968 | Sawyer | 322/29 |
| 3,508,138 | 4/1970 | Schatz | 310/198 |
| 2,725,490 | 11/1955 | Pestarini | 322/90 |
| 3,422,339 | 1/1969 | Baker | 310/68 |

*Primary Examiner*—J. D. Miller
*Assistant Examiner*—R. Skudy
*Attorney*—Vincent J. Rauner and R. J. La Porte

[57] ABSTRACT

A power supply system for a motor vehicle includes an alternator having a rotating field winding and a three phase stator winding. The output of the stator winding is rectified to power a load. A switching arrangement is connected to the stator winding to connect the phases thereof in series relation at relatively low rotational speeds of the field winding and in delta relation at higher rotational speeds, to substantially maximize the output of the system at low and high engine speeds.

5 Claims, 2 Drawing Figures

INVENTOR:
JAMES R. CHERRY
BY: Ronald R. LaPorte
ATTY.

3,689,826

MOTOR VEHICLE POWER SUPPLY SYSTEM

BACKGROUND

This invention relates generally to power generating systems and more particularly to such systems used in motor vehicles.

Motor vehicle power supply systems for providing direct current from an electrical alternator device are limited by the design characteristics of the alternator. In motor vehicle power supplies, sufficient current output at both low and high engine speeds, as well as efficient charging of a battery connected to the output of the system at even lower engine idle speeds, is desirable.

Heretofore, in order to provide sufficient current output at both low and high engine speeds and efficient idle speed charging of a battery connected to the power supply system, the alternator thereof had to be dimensionally large and was costly to fabricate.

It has been suggested to connect the stator winding of the alternator device first in a wye configuration at low alternator speeds and then in a delta configuration at higher alternator speeds. While this serves to provide good current output at both low and high engine or alternator speeds, the cut-in of the alternator at lower engine idle speeds is lacking.

SUMMARY

Accordingly, it is a primary object of the present invention to provide a new and improved power supply system which provides both maximum current output at low and high engine speeds and ample output current at relatively low idle speeds for charging a battery, etc.

It is another object of the present invention to provide a new and improved alternator for use in power supply systems of the type described.

It is another object of the invention to provide an alternator of the above described type which is relatively small dimensionally and relatively inexpensive to fabricate.

Briefly, a preferred embodiment of a power supply system according to the invention includes an alternator having a rotating field winding and a three phase stator winding. The outputs of the alternator phases are rectified by suitable diode arrangements. A switch assembly is connected in a predetermined fashion between the phases of the alternator stator and is movable between a first condition whereby the three phases of the alternator stator are connected in series relation to provide charging current for a battery connected thereto at relatively low engine idle speeds and low speeds generally, and to a second condition when the engine speed is increased predeterminedly, whereby the three phases are connected in a delta relation, to provide maximum output current from the alternator at relatively high engine speeds.

DETAILED DESCRIPTION

Figure 1:
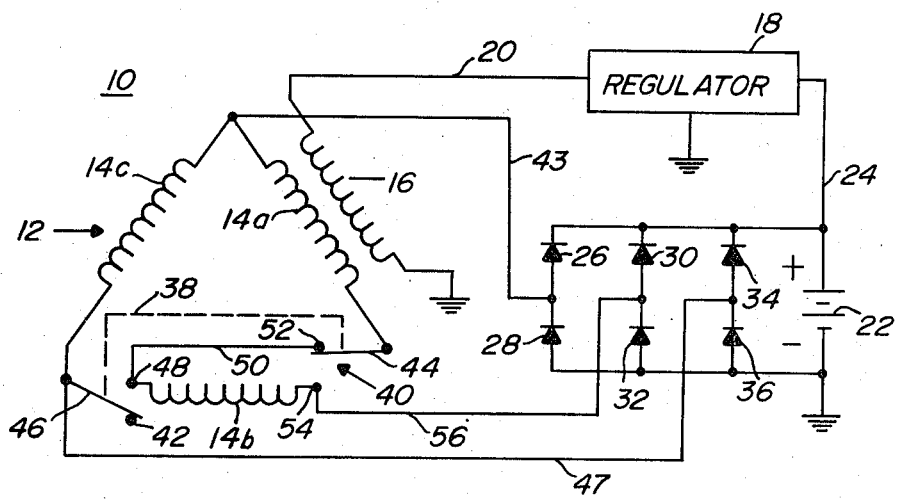
FIG. 1 is a schematic diagram of a preferred embodiment of the power supply system according to the invention.

Referring now to FIG. 1, there is shown a motor vehicle power supply system 10 incorporating an alternator 12 having a stator winding 14. The stator winding has three phases 14a, 14b, 14c. The field excitation for the alternator is created by a conventionally wound rotating field 16. A standard regulator 18 is connected to the field winding via lead 20 and to the battery or load 22 via lead 24.

Three sets of rectifiers, each comprising a diode pair; i.e. 26, 28; 30, 32; and 34, 36, are connected to the outputs of the three phases of stator winding 14 to provide full wave rectification thereof.

A switching assembly designated generally by the numeral 38, and including a pair of contact sets 40, 42, is provided to connect the three phases of stator winding 14 in series or delta connection, depending upon the speed of the engine (not shown) driving the alternator, and thus the speed of the alternator itself. As is shown in FIG. 1, first ends of phases 14a, 14c of the stator winding are connected to each other and to output lead 43. The opposite end of phase 14a is connected to the armature 44 of contact set 40, while the opposite end of phase 14c is connected to the armature 46 of contact set 42 and to output lead 47.

A first end of phase 14b of the stator winding is connected to the contact 48 of contact set 42 and to a lead 50 also connected to contact 52 of the contact set 40. The other end of phase 14b is connected at contact 54 to output lead 56.

In series operation of the alternator, the armatures 44, 46 are in the positions shown in the drawing. In this case, diodes 30, 32, 34, 36 provide full wave rectification of the output via leads 47, 56 from the series connected phases of the stator winding.

In delta operation, the armatures are moved so that armature 44 is connected to contact 54 and armature 46 is connected to contact 48. In delta operation, diodes 26, 28, 30, 32 provide full wave rectification of the output of phase 14a across output leads 43, 56, while diodes 30, 32, 34, 36 and 26, 28, 34, 36 rectify the output of phases 14b, 14c, across leads 56, 47 and 43, 47, respectively.

Figure 2:
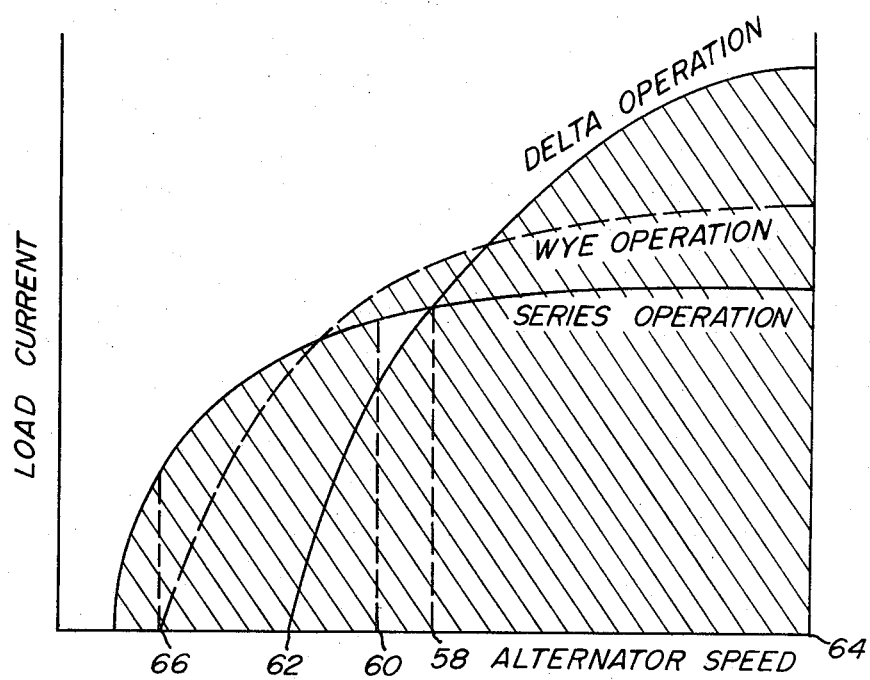
FIG. 2 is a graph of the load current versus alternator speed of the system of FIG. 1.

In FIG. 2, the load current of the power supply system 10 is plotted against the speed of the alternator. The graph shows that series operation of the alternator stator winding provides an output current at much slower alternator speeds than for delta operation. At some point, designated 58, the two curves cross. At alternator speeds above this point, it becomes more efficient to operate the system in delta configuration, while below this point series operation is advantageous.

A point 60 is also shown on the graph. This point represents the alternator speed at which switching from series to delta connection would occur. The switching point is, however, dependent upon the type of switching used. The switching point may, it is apparent, vary anywhere from a point 62 whereat the starting speed for delta operation begins, to point 64, the maximum speed of the alternator. The switching means used may be mechanical, electromechanical or electrical.

A third curve is shown in the graph of FIG. 2. This curve represents the wye operation of a three phase stator winding such as 14 of the power supply system 10. It is provided to illustrate the advantage of connecting the winding 14 of the alternator in series initially rather than in wye configuration. It is shown that in series operation, charging of a battery can be provided at slower alternator speeds, since the series stator connection can supply current for charging, etc., prior to the wye stator connection. In fact, as can be seen at point 66, the series connected stator is providing a relatively large amount of current for charging a battery, etc., when the wye connected stator is still at zero current output.

While it is true that at higher alternator speeds, in the vicinity of points 60 and 58 of the graph, greater current output can be realized with the wye connected stator, this is relatively insignificant since at higher speeds sufficient charging current is provided in any case by the series connected stator.

Thus, the power supply system according to the invention provides good low (idle) speed current output for battery charging, etc., and at the same time provides sufficient output current at higher, relatively low and high alternator speeds. In addition, the alternator can be made relatively small dimensionally since the standard stator winding is used for both series and delta operation and is therefore relatively inexpensive to fabricate.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A power supply system for an electrical load, including in combination; voltage generator means having three phase winding means, rectifying means connecting said three phase winding means to the load and switching means connected to said winding means operable to a first condition for connecting the three phases of said winding means electrically in series relation with respect to each other and to a second condition for connecting the phases of said winding means in a delta relation with respect to each other.

2. A power supply system as claimed in claim 1 wherein said voltage generator means include excitation winding means mounted for rotation adjacent said three phase winding means for inducing a current flow in the latter and wherein said switching means is operable to connect the phases of said winding means in series relation at relatively low rotational speeds of said excitation winding means and in delta relation at relatively high rotational speeds, greater than a predetermined rotational speed.

3. A power supply system as claimed in claim 1 wherein said switching means include first and second contact sets, each including armature means, each said contact set connected between a first end of one of two phases of said three phase winding means connected at the opposite ends to each other, and to an end of the third phase of the three phase winding means, respectively, whereby upon positioning each said armature means to a first setting, of the three phases of said winding means are connected in series relation and upon positioning each said armature means to a second setting, the three phases of said winding means are connected in delta relation.

4. A motor vehicle power supply system for providing power to a load including in combination; an alternator having a three phase stator winding and a rotating field winding for inducing a current flow in said stator winding to provide an output therefrom, said field winding being rotated in accordance with the speed of the engine of said vehicle, rectification means interposed between said stator winding and said load for rectifying the output of said stator winding to provide power to said load, means connected to said alternator for regulating the output of said stator winding and switching means connected to said stator winding and operable to connect the three phases of said stator winding electrically in series relation at rotational speeds of said field winding lower than a predetermined speed and to connect the three phases of said stator winding electrically in delta relation at rotational speeds higher than said predetermined speed, thereby to substantially maximize the output of said stator winding at both relatively low and high rotational speeds.

5. A motor vehicle power supply system as claimed in claim 4 wherein said rectification means include three groups of diodes, two of said groups providing full wave rectification of the output of said stator winding when the phases of the latter are series connected and predetermined pairs of said groups providing full wave rectification of the output of individual ones of the phases of said stator winding when the latter is delta connected.

* * * * *